(12) United States Patent
Ito et al.

(10) Patent No.: US 12,502,634 B2
(45) Date of Patent: Dec. 23, 2025

(54) HONEYCOMB FILTER

(71) Applicant: NGK INSULATORS, LTD., Nagoya (JP)

(72) Inventors: Tadato Ito, Komaki (JP); Sho Inotsume, Miyoshi (JP)

(73) Assignee: NGK INSULATORS, LTD., Nagoya (JP)

( * ) Notice: Subject to any disclaimer, the term of this patent is extended or adjusted under 35 U.S.C. 154(b) by 99 days.

(21) Appl. No.: 18/333,667

(22) Filed: Jun. 13, 2023

(65) Prior Publication Data

US 2023/0405505 A1 Dec. 21, 2023

(30) Foreign Application Priority Data

Jun. 20, 2022 (CN) .......................... 202210695994.8

(51) Int. Cl.
*B01D 46/24* (2006.01)

(52) U.S. Cl.
CPC ....... *B01D 46/2459* (2013.01); *B01D 46/244* (2013.01); *B01D 46/24491* (2021.08); *B01D 46/2484* (2021.08); *B01D 46/249* (2021.08)

(58) Field of Classification Search
CPC .......... B01D 46/2459; B01D 46/24491; B01D 46/2484; B01D 46/249; B01D 46/244
USPC ....................................................... 55/523
See application file for complete search history.

(56) References Cited

U.S. PATENT DOCUMENTS

| | | | |
|---|---|---|---|
| 2006/0210765 A1* | 9/2006 | Ohno | B01D 46/2429 428/116 |
| 2010/0058725 A1* | 3/2010 | Konomi | B01D 46/2482 427/193 |
| 2017/0234181 A1 | 8/2017 | Shibayama et al. | |

FOREIGN PATENT DOCUMENTS

| | | |
|---|---|---|
| EP | 2 481 542 A1 | 8/2012 |
| EP | 2 484 504 A1 | 8/2012 |
| JP | 2017-145171 A | 8/2017 |
| WO | 2011/036971 A1 | 3/2011 |
| WO | 2011/040145 A1 | 4/2011 |

OTHER PUBLICATIONS

Bruce Weiner, Particle Size: What is it and Why is it Important? Jun. 11, 2019, The State of Scientific Marketing, p. 1, 1st paragraph. (Year: 2019).*

(Continued)

*Primary Examiner* — Jennifer Dieterle
*Assistant Examiner* — Qianping He
(74) *Attorney, Agent, or Firm* — BURR PATENT LAW, PLLC

(57) ABSTRACT

A honeycomb filter comprising a pillar-shaped honeycomb structure having a porous partition wall disposed so as to surround a plurality of cells which serve as a fluid through channel extending from an inflow end face to an outflow end face and a porous plugging portion provided at either an end on the inflow end face side or an end on the outflow end face side of the cell, wherein in a processed image obtained by binarizing an electron microscope image of a visual field area of 480 μm×640 μm of the plugging portion, the plugging portion is composed of a plurality of particles, and the number of the particles having an area of 0.25 μm² or more is 1000 or more and 3500 or less.

4 Claims, 3 Drawing Sheets

(56) References Cited

OTHER PUBLICATIONS

Lin Lin et al., Identifying Facile and accurate method of measuring thickness of the active layer of thin films composite membranes, 2016, Journal of membrane science, 498(2016)167-179, p. 1, abstract (Year: 2016).*

Q. He. et al., Biological serial Block Face scanning electron microscopy at improved Z-resolution based on Monte Carlo Model, Jan. 10, 2018, Scientific Reports, (2018)8:12985,p. 5, Fig. 2 (Year: 2018).*

Japanese Office Action (Application No. 2023-088191) dated May 28, 2024 (with English translation) (10 pages).

Japanese Offer of Information dated Jan. 24, 2024 (Application No. 2023-088191).

* cited by examiner

HONEYCOMB FILTER

RELATED APPLICATIONS

The present application is an application based on Chinese Patent Application No. 202210695994.8 filed on Jun. 20, 2022 with State Intellectual Property Office of the people's Republic of China, the entire contents of which are incorporated herein by reference.

BACKGROUND OF THE INVENTION

Field of the Invention

The present invention relates to a honeycomb filter. More specifically, the present invention relates to a honeycomb filter capable of relaxing thermal stress generated in a plugging portion plugging an open end of a cell.

Description of the Related Art

Conventionally, a honeycomb filter using a honeycomb structure has been known as a filter for trapping particulate matter in exhaust gas emitted from an internal combustion engine such as an automobile engine or a device for purifying toxic gas components such as CO, HC, NOx (see Patent Document 1). The honeycomb structure includes a partition wall made of porous ceramics such as cordierite and a plurality of cells defined by the partition wall. A honeycomb filter includes such a honeycomb structure provided with plugging portions so as to plug the open ends at the inflow end face side and the outflow end face side of the plurality of cells alternately. In other words, the honeycomb filter has a structure in which inflow cells having the inflow end face side open and the outflow end face side plugged and outflow cells having the inflow end face side plugged and the outflow end face side open are arranged alternately with the partition wall therebetween. In the honeycomb filter, the porous partition wall serves as a filter for trapping the particulate matter in exhaust gas. Hereinafter, the particulate matter contained in exhaust gas may be referred to as "PM". The "PM" is an abbreviation for "Particulate Matter."

Exhaust gas is purified by a honeycomb filter as follows. First, the honeycomb filter is disposed such that the inflow end face side is positioned on the upstream side of an exhaust system through which exhaust gas is emitted. The exhaust gas flows into inflow cells from the inflow end face side of the honeycomb filter. Then, the exhaust gas that has flowed into the inflow cells passes through a porous partition wall, flows toward outflow cells, and is emitted from the outflow end face of the honeycomb filter. When passing through the porous partition wall, PM or the like in the exhaust gas is trapped and removed. In addition, such honeycomb filters may be loaded with an oxidation catalyst for promoting oxidation (combustion) of PM, an exhaust gas purification catalyst for purifying harmful components such as NOx, and the like.

[Patent Document 1] JP-A-2017-145171

In recent years, exhaust gas regulations for gasoline engine vehicles are becoming stricter year by year. Therefore, it is necessary to improve the performance of honeycomb filters for gasoline engine vehicles. In addition, the honeycomb filters are used with an exhaust gas purification catalyst loaded, and as the amount of the catalyst loaded increases, the demand for filters with high porosity is also increasing. For honeycomb filters for diesel engine, thin-walled honeycomb filters intended to reduce pressure loss have also been developed.

Continuous removal of PM in exhaust gas with a honeycomb filter causes the accumulation of PM inside the honeycomb filter, and so increases the pressure loss of the honeycomb filter. Then, a purification device including such a honeycomb filter is configured to burn the PM accumulated inside the honeycomb filter automatically or manually to avoid an excessive pressure loss of the honeycomb filter. Hereinafter, the operation to burn the PM accumulated inside a honeycomb filter may be referred to as "regeneration operation" of the honeycomb filter. Such regeneration operation of a honeycomb filter forcibly burns the PM accumulated inside the honeycomb filter, so that the temperature inside the honeycomb filter rises. Therefore, the honeycomb filter may be damaged due to the heat generated during the regeneration operation, and in particular, in a honeycomb filter with high porosity, it has been desired to develop a honeycomb filter capable of relaxing thermal stress generated in a plugging portion during the regeneration operation. For example, Patent Document 1 discloses a technique of preventing cracks at an end of a cell from occurring and suppressing a plugging portion from falling out of the cell, by specifying a Young's modulus or porosity of the plugging portion. With regard to the technique described in Patent Document 1, it is desired to further improve thermal shock resistance of the plugging portion.

The present invention has been made in view of the problems with the prior arts described above. According to the present invention, there is provided a honeycomb filter capable of relaxing thermal stress generated in a plugging portion during regeneration operation.

SUMMARY OF THE INVENTION

According to the present invention, a honeycomb filter described below is provided.

[1] A honeycomb filter including: a pillar-shaped honeycomb structure having a porous partition wall disposed so as to surround a plurality of cells which serve as a fluid through channel extending from an inflow end face to an outflow end face; and a porous plugging portion provided at either an end on the inflow end face side or an end on the outflow end face side of the cell, wherein in a processed image obtained by binarizing an electron microscope image of a visual field area of 480 μm×640 μm of the plugging portion, the plugging portion is composed of a plurality of particles, and the number of the particles having an area of 0.25 $\mu m^2$ or more is 1000 or more and 3500 or less.

[2] The honeycomb filter according to [1], wherein in the processed image, an average area of the particles having an area of 0.25 $\mu m^2$ or more is 20 $\mu m^2$ or more and 90 $\mu m^2$ or less.

[3] The honeycomb filter according to [1] or [2], wherein in the processed image, a porosity of the plugging portion is 40% or more and 75% or less.

[4] The honeycomb filter according to any one of [1] to [3], wherein in a particle size distribution based on the number of the particles having an area of 0.25 $\mu m^2$ or more in the processed image, the area of the particles having a particle diameter d90 when the cumulative value is 90% is 5 $\mu m^2$ or more and 62.5 $\mu m^2$ or less.

[5] The honeycomb filter according to any one of [1] to [4], wherein a porosity of the partition wall constituting the honeycomb structure is 45% or more and 75% or less.

The honeycomb filter of the present invention can relax thermal stress generated in a plugging portion during regeneration process.

DESCRIPTION OF THE PREFERRED EMBODIMENTS

The following will describe embodiments of the present invention; however, the present invention is not limited to the following embodiments. Therefore, it should be understood that those in which modifications, improvements, and the like have been appropriately added to the following embodiments are within the scope of the present invention based on the ordinary knowledge of those skilled in the art without departing from the spirit of the present invention.

Figure 1:
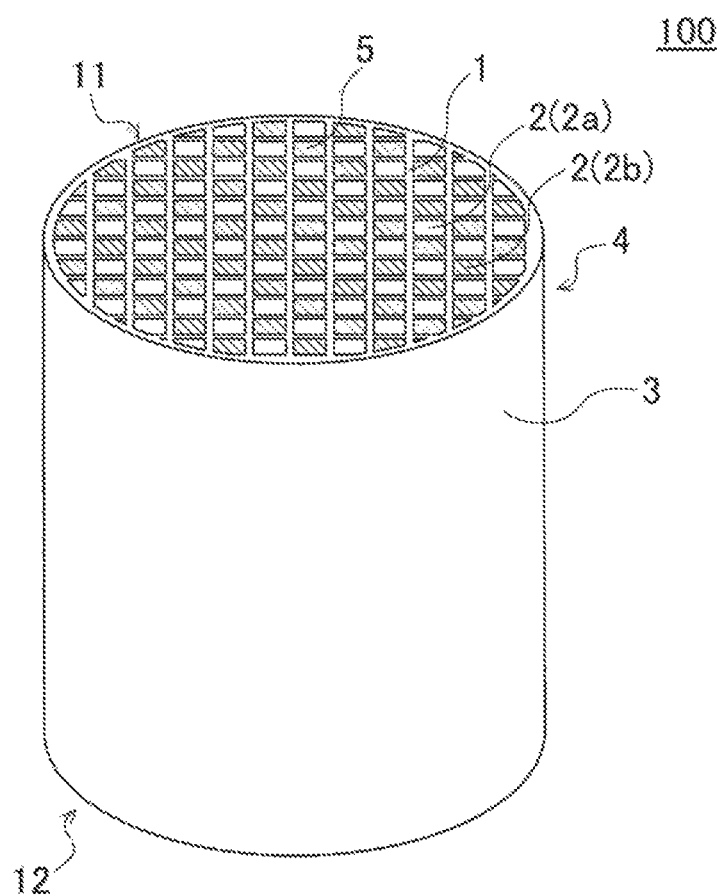
FIG. 1 is a perspective view schematically showing an embodiment of a honeycomb filter according to the present invention.
Figure 2:
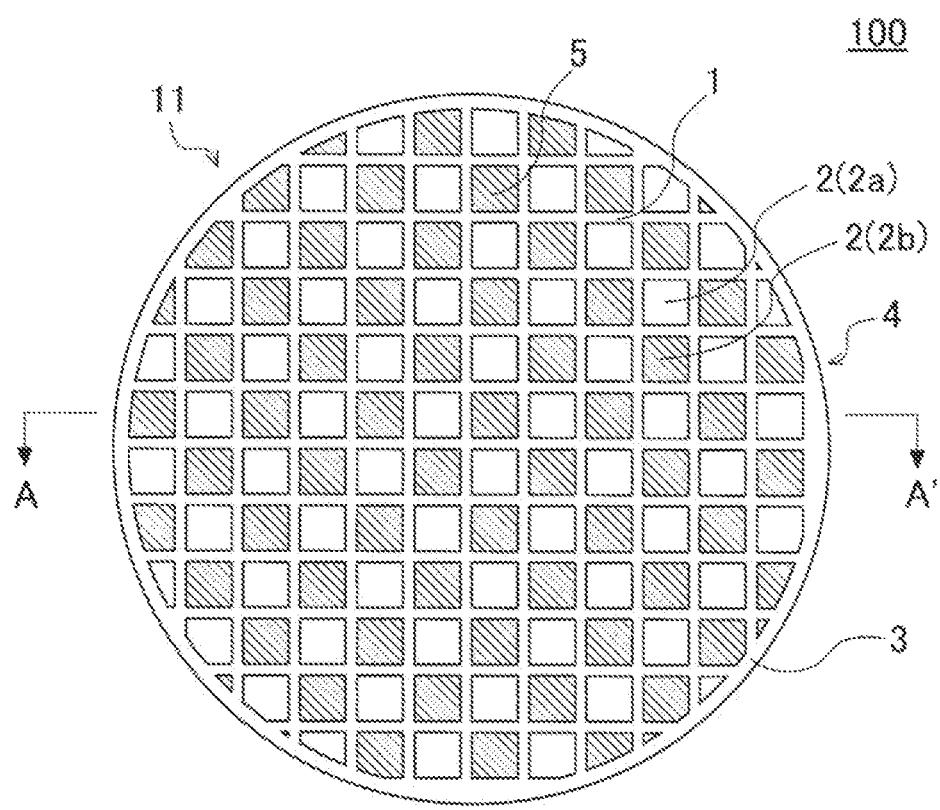
FIG. 2 is a plan view showing an inflow end face side of the honeycomb filter shown in FIG. 1.
Figure 3:
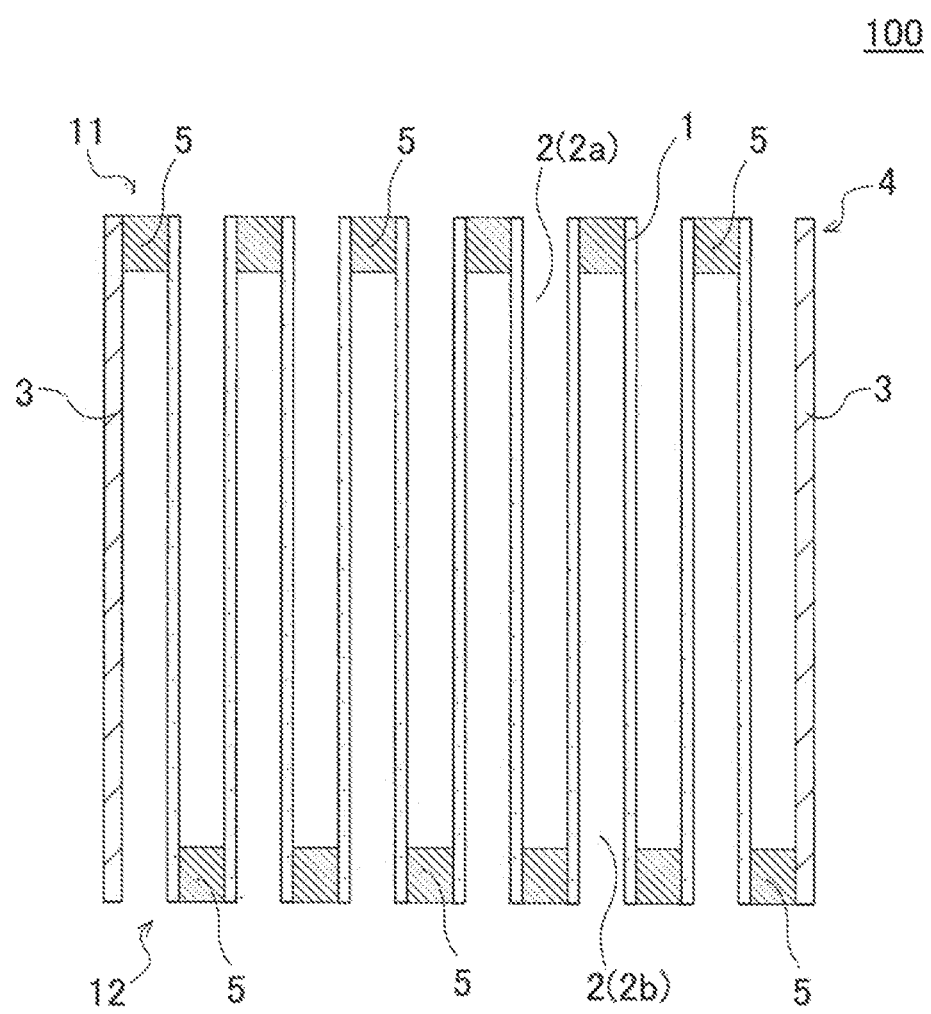
FIG. 3 is a sectional view schematically showing a section taken along the line A-A' of FIG. 2.

(1) Honeycomb Filter:

An embodiment of the honeycomb filter of the present invention is a honeycomb filter 100 as shown in FIGS. 1 to 3. Here, FIG. 1 is a perspective view schematically showing an embodiment of a honeycomb filter according to the invention. FIG. 2 is a plan view showing an inflow end face side of the honeycomb filter shown in FIG. 1. FIG. 3 is a sectional view schematically showing a section taken along the line A-A' of FIG. 2.

As shown in FIGS. 1 to 3, the honeycomb filter 100 includes a honeycomb structure 4 and a plugging portion 5. The honeycomb structure 4 has a pillar shape, and has a porous partition wall 1 disposed so as to surround a plurality of cells 2 extending from an inflow end face 11 to an outflow end face 12 and serve as a fluid through channel. In the honeycomb filter 100, the honeycomb structure 4 has a pillar shape, and further has a circumferential wall 3 at the circumferential side face. In other words, the circumferential wall 3 is provided so as to encompass the partition wall 1 provided in a grid pattern.

The plugging portion 5 is provided at open end on the inflow end face 11 side or the outflow end face 12 side of each cell 2. In the honeycomb filters 100 shown in FIGS. 1 to 3, the plugging portions 5 are provided at open ends of the end on the inflow end face 11 side of the predetermined cells 2 and open ends of the end on the outflow end face 12 side of the remaining cells 2, respectively. The cells 2 which have the plugging portions 5 provided at the open ends on the outflow end face 12 side and which have the inflow end face 11 side open are defined as inflow cells 2a. Moreover, the cells 2 which have the plugging portions 5 provided at the open ends on the inflow end face 11 side and which have the outflow end face 12 side open are defined as outflow cells 2b. The inflow cells 2a and the outflow cells 2b are preferably arranged alternately with the partition wall 1 therebetween. Thereby, a checkerboard pattern is preferably formed by the plugging portions 5 and "the open ends of the cells 2" on both end faces of the honeycomb filter 100.

The honeycomb filter 100 of the present embodiment has particularly major properties in the configuration of the plugging portion 5 provided to plug open end of the cell 2. That is, in the processed image obtained by binarizing an electron microscope image of a visual field area of 480 μm×640 μm of the plugging portion 5 of the honeycomb filter 100, the plugging portion 5 is composed of a plurality of particles, and the number of the particles having an area of 0.25 μm$^2$ or more is 1000 or more and 3500 or less. The honeycomb filter 100 configured as described above can relax thermal stress generated in the plugging portion 5 during regeneration operation.

The honeycomb filter 100 is also excellent in trapping performance against particulate matter (PM) in exhaust gas. For example, in increasing porosity of the honeycomb filter 100, increasing porosity of the plugging portion 5 is also effective for relaxing the thermal stress during regeneration operation. However, in increasing porosity of the plugging portion 5, the pore diameter of the plugging portion 5 tends to increase during a firing process or the like at the time of manufacturing. If the pore diameter of the plugging portion 5 is excessively increased, PM in exhaust gas may pass through the plugging portion 5, and the PM that passed through may leak out from the outflow end face 12 side of the honeycomb filter 100. In the honeycomb filter 100 of the present embodiment, since the number of the particles having an area of 0.25 μm$^2$ or more in the visual field area described above is 1000 or more and 3500 or less, it is possible to effectively suppress the passing through of PM.

For example, in a conventional plugging portion, when a cordierite forming raw material is used as a raw material of the plugging portion, the raw material may be cordierite-formed and the pore size of the plugging portion may increase by firing at the time of manufacturing. In such a conventional plugging portion, the individual particles constituting the plugging portion are bonded by sintering, and the number of apparent particles in the visual field area described above is reduced. In the plugging portion in which the number of the particles in the visual field area is reduced, the pore diameter thereof increases, and PM easily passes through.

Other configurations of the plugging portion 5 are not particularly limited as long as the number of the particles having an area of 0.25 μm$^2$ or more in the visual field area described above is 1000 or more and 3500 or less. For example, the material of the particles constituting the plugging portion 5 is not particularly limited, and examples of the main component include various ceramics of an oxide or a non-oxide from the viewpoint of strength, thermal resistance, durability, and the like. The plugging portion 5 may be one in which a plurality of particles are bonded to each other by, for example, a bonding agent (binder) or the like, or one in which a plurality of particles are bonded by sintering or the like while maintaining the shapes of the particles in the visual field area described above. In any case, it is preferable that the area of each particle and the number of these particles can be determined in the processed image of the visual field area described above.

In the honeycomb filter 100 of the present embodiment, the plugging portion 5 is not particularly limited, but is preferably an unfired porous material in which a plurality of particles made of ceramics or the like are bonded to each other by a material having a binder performance (for example, colloidal silica or the like). Hereinafter, the plugging portion 5 made of a porous material in which a plurality of particles are bonded to each other in an unfired state may be referred to as "unfired plugging portion 5". For example, by using the unfired plugging portion 5 composed of a plurality of particles, thermal stress generated during regeneration operation or the like can be more effectively relaxed. Further, even in the unfired plugging portion 5, by setting the number of the above-described particles to 1000 or more and 3500 or less, it is possible to effectively suppress the fall-off of the plugging portion 5 from the open end of the cell 2. That is, by setting the number of the particles constituting the plugging portion 5 to the above numerical range, the plugging portion 5 becomes more dense, and it is possible to realize the same strength against fall-off as that of the plugging portion 5 made of a fired body of the particles. In addition, the unfired plugging portion 5 is less likely to have a slit defect of the plugging portion 5 than the plugging portion 5 made of a fired body of the particles. The term "slit defect" means that a slit-like defect occurs in a part of the plugging portion 5. Further, the unfired plugging portion 5 is easy to repair or modify the plugging portion 5 if various problems such as passing-through of PM in exhaust gas occur, and is excellent in the maintainability of the honeycomb filter 100.

The processed image for observing the number of particles constituting the plugging portion 5 can be obtained by the following methods. First, a section of the plugging portion 5 of the honeycomb filter 100 is imaged by a scanning electron microscope (hereinafter, also referred to as "SEM"), and a SEM image having a magnification of 200 times is obtained. "SEM" is an abbreviation for "Scanning Electron Microscope." SEM image is a tiff image having an image size of 960×1280 pixels. As the scanning electron microscope, for example, a scanning electron microscope "SU3500" manufactured by Hitachi High-Tech Corporation can be used.

Next, the designated area of the obtained SEM image is binarized by a discriminant analysis method. In the binarization process, 30 pixels at the image ends of SEM image are excluded to binarize. The binarization process separates the plugging portion 5 in the designated area in the SEM image into an entity part in which the particles constituting the plugging portion 5 are present and a gap part between the respective particles (entity part). The binarization process is performed using one pixel of the above-described image size as a minimum unit. The binarization process can be performed using an image analysis software device "Winroof 2018 (trade name)" manufactured by Mitani Corporation.

Next, the number of the particles having an area of 0.25 $\mu m^2$ or more is measured for the processed images binarized as described above. The number of particles is measured in the processed images of a visual field area of 480 $\mu m \times 640$ $\mu m$ of the plugging portion 5. The actual measurement of the number of particles can be performed by image analysis using the above-described image analysis software device. The number of particles shall be measured in the measurement field at the following points of the plugging portion 5. First, the plugging portion 5 to be measured is a plugging portion 5 near the center of an end face of the honeycomb filter 100 (honeycomb structure 4). For a section of the plugging portion 5 to be measured, the area around the partition wall 1 disposed so as to surround the plugging portion 5 is avoided, and the area where the plugging portion 5 does not have obvious sink defects such as depressions or holes is to be measured. Further, the number of particles is measured for each of the processed images of three consecutive visual fields, and is an arithmetic average value of the number of particles measured in the three visual fields. The three consecutive visual fields refer to the adjacency of three measurement visual fields in SEM image.

Hereinafter, the "particles having an area of 0.25 $\mu m^2$ or more" in the binarized processed images described above may be referred to as "specific constituent particles" constituting the plugging portion 5. Further, the "visual field area of 480 $\mu m \times 640$ $\mu m$" for measuring the number of the specific constituent particles in the processed image of the plugging portion 5 may be referred to as a "specific visual field area" for measuring specific constituent particles constituting the plugging portion 5. Therefore, in the honeycomb filter 100 of the present embodiment, it can be said that the number of the specific constituent particles having an area of 0.25 $\mu m^2$ or more is 1000 or more and 3500 or less in the processed image of the specific visual field area of the plugging portion 5. In the honeycomb filter 100, the number of the specific constituent particles described above may be 1000 or more and 3500 or less, and is preferably 1500 or more and 3000 or less. One example of the honeycomb filter of the present invention is a honeycomb filter having the number of the specific constituent particles of 2348. Other examples include honeycomb filters having the number of the specific constituent particles of 2833 and 2879.

Further, in the processed image of the specific visual field area of the plugging portion 5 described so far, an average area of the specific constituent particles having an area of 0.25 $\mu m^2$ or more is preferably 20 $\mu m^2$ or more and 90 $\mu m^2$ or less, more preferably 20 $\mu m^2$ or more and 50 $\mu m^2$ or less. When the average area of the specific constituent particles is 20 $\mu m^2$ or more and 50 $\mu m^2$ or less, the effect of relaxing thermal stress generated in the plugging portion 5 is particularly remarkable. The average area of the specific constituent particles can be measured by image analysis using the above-described image analysis software device. Setting the average area of the specific constituent particles within the above numerical range is preferable in terms of stress relaxation and strength of the plugging portion 5. One example of the honeycomb filter of the present invention is a honeycomb filter having an average area of the specific constituent particles of 43 $\mu m^2$. Other examples include a honeycomb filter having an average area of the specific constituent particles of 41 $\mu m^2$.

Further, in the processed image of the specific visual field area, a porosity of the plugging portion 5 is preferably 40% or more and 75% or less, and more preferably 50% or more and 70% or less. The porosity of the plugging portion 5 can be measured by image analysis using the above-described image analysis software device. Specifically, the percentage (%) of the ratio of the area of the gap part to the total area of the processed image (i.e., the total area of the entity part and the gap part) is the porosity of the plugging portion 5. One example of the honeycomb filter of the present invention is a honeycomb filter having a porosity of the plugging portion 5 of 63.64%. Other examples include honeycomb filters having a porosity of the plugging portion 5 of 55.55% and 57.49%.

In a particle size distribution based on the number of the specific constituent particles in the processed image of the specific visual field area, the area of the particles having a particle diameter d90 when the cumulative value is 90% (that is, the cumulative number of the specific constituent particles is 90% of the total number), is preferably 5 $\mu m^2$ or more and 62.5 $\mu m^2$ or less, more preferably 25 $\mu m^2$ or more and 50 $\mu m^2$ or less. In the particle size distribution based on the number of the specific constituent particles in the processed image, the area of the particles having a particle diameter d90 can be measured by image analysis using the above-described image analysis software device. The area of the particles having a particle diameter d90 is preferably set to the above numerical range in terms of the strength of the plugging portion 5. For example, even if the porosity of the plugging portion 5 and the number of particles of the specific constituent particles are the same, if the area of the particles having a particle diameter d90 is small, the area ratio occupied by the large particles having a particle diameter d90 or larger increases. Here, from the viewpoint of relaxation of thermal stress occurring in the plugging portion 5, it is important that the number of the large particles (that is, particles that are difficult to relax thermal stress) is small due to the large number of small particles, and a larger value of the particle diameter d90 is more advantageous for the thermal stress relaxation. In the honeycomb filter 100 of the present embodiment, the above-described effects are particularly remarkable in the range of the area of the particles having a particle diameter d90 of the specific constituent particles of 25 $\mu m^2$ or more and 50 $\mu m^2$ or less. One example of the honeycomb filter of the present invention is a honeycomb filter having an area of the particles having a particle diameter d90 of 35 $\mu m^2$. Other examples include honeycomb filters having an area of the particle having a particle diameter d90 of 48 $\mu m^2$ and 37 $\mu m^2$.

In the honeycomb filter 100, the configuration of the honeycomb structure 4 having the porous partition wall 1 is not particularly limited. However, preferred embodiments of the honeycomb structure 4 are as follows.

The porosity of the partition wall 1 constituting honeycomb structure 4 is preferably 45% or more and 75% or less, more preferably 50% or more and 70% or less. The porosity of the partition wall 1 is a value measured by mercury press-in method. The porosity of the partition wall 1 can be measured using Autopore 9500 (product name) manufactured by Micromeritics, for example. To measure the porosity of the partition wall 1, a part of the partition wall 1 is cut out from the honeycomb structure 4 to prepare a sample piece, and the obtained sample piece may be used. The porosity of the partition wall 1 is preferably constant over the entire region of the honeycomb structure 4. If the porosity of the partition wall 1 is less than 45%, pressure loss of the honeycomb filter 100 may increase. If the porosity of the partition wall 1 exceeds 75%, mechanical strength (e.g., isostatic strength) of the honeycomb filter 100 may decrease. In the honeycomb filter 100 of the present embodiment, the above-described effects are particularly remarkable in the range of the porosity of the partition wall 1 of 50% or more and 70% or less. One example of the honeycomb filter of the present invention is a honeycomb filter having a porosity of the partition wall 1 of 65%. Other examples include honeycomb filters having a porosity of the partition wall 1 of 63.4% and 64.2%.

The thickness of the partition wall 1 is not particularly limited, but for example, the thickness of partition wall 1 is preferably 0.152 to 0.305 μmm, and more preferably 0.203 to 0.254 μmm. The thickness of the partition wall 1 can be measured with a scanning electron microscope or a microscope, for example. When the thickness of the partition wall 1 is less than 0.152 μmm, enough strength may not be obtained. On the other hand, when the thickness of the partition wall 1 exceeds 0.305 μmm, pressure loss of the honeycomb filter 100 may increase.

The shape of the cells 2 defined by the partition wall 1 is not particularly limited. For example, the shapes of the cells 2 in a section that is orthogonal to the extending direction of the cells 2 may be a polygonal shape, a circular shape, an elliptical shape, and the like. The polygonal shape can include a triangle, a quadrangle, a pentagon, a hexagon, and an octagon, and the like. The shape of the cells 2 is preferably a triangle, a quadrangle, a pentagon, an hexagon, or an octagon. Further, regarding the shapes of the cells 2, all the cells 2 may have the same shape or different shapes. For example, although not shown, quadrangular cells and octagonal cells may be mixed. Further, regarding the sizes of the cells 2, all the cells 2 may have the same size or different sizes. For example, although not shown, among the plurality of cells, some cells may be made to be large, and other cells may be made to be relatively smaller. In the present invention, a cell means a space surrounded by a partition wall.

The cell density of the honeycomb structure 4 is not particularly limited, but for example, the cell density of the honeycomb structure 4 is preferably 31 to 62 cells/cm$^2$, and more preferably 39 to 54 cells/cm$^2$. With this configuration, the honeycomb filter 100 can suppress increase in pressure loss while maintaining the trapping performance.

The shape of the honeycomb structure 4 is not particularly limited. The shape of the honeycomb structure 4 can be a pillar-shape in which the shape of the inflow end face 11 and the outflow end face 12 have a circular shape, an elliptical shape, a polygonal shape or the like.

The size of the honeycomb structure 4, for example, the length from the inflow end face 11 to the outflow end face 12, and the size of a section orthogonal to the extending direction of the cells 2 of the honeycomb structure 4, is not particularly limited. Each size may be selected as appropriate such that optimum purification performance is obtained when the honeycomb filter 100 is used as a filter for purifying exhaust gas.

The material of the partition wall 1 constituting the honeycomb structure 4 is not particularly limited. For example, the material of the partition wall 1 preferably contains at least one selected from the group consisting of cordierite, silicon carbide, silicon-silicon carbide composite material, cordierite-silicon carbide composite material, silicon nitride, mullite, alumina, and aluminium titanate. In the honeycomb filter 100 of the present embodiment, as the material of the partition wall 1, a material containing at least one of cordierite, silicon carbide, and aluminium titanate can be exemplified as a preferred example.

The material of the plugging portion 5 is also not particularly limited. For example, a material similar to the material of the partition wall 1 described above may be used.

In the honeycomb filter 100, the partition wall 1 defining the plurality of cells 2 is preferably loaded with a catalyst for purifying exhaust gas. Loading the partition wall 1 with a catalyst refers to coating the catalyst onto the surface of the partition wall 1 and the inner walls of the pores formed in the partition wall 1. With this configuration, it is possible to turn CO, NOx, HC and the like in exhaust gas into harmless substances by catalytic reaction. In addition, the oxidation of PM of trapped soot or the like can be accelerated.

The catalyst loaded on the partition wall 1 is not particularly limited. For example, a catalyst containing a platinum group element and containing an oxide of at least one element among aluminum, zirconium, and cerium can be used.

(2) Manufacturing Method of Honeycomb Filter

A manufacturing method of the honeycomb filter of the present invention is not particularly limited, and the honeycomb filter can be manufactured by the following method, for example. First, a plastic kneaded material for making a honeycomb structure is prepared. The kneaded material for making honeycomb structure can be prepared by adding an additive such as a binder, pore former, and water, as appropriate, to a material selected from the above-described suitable materials of the partition wall as a raw material powder.

Next, the kneaded material thus obtained is subjected to extrusion so as to make a pillar-shaped honeycomb formed body having a partition wall defining a plurality of cells and a circumferential wall disposed to encompass the partition wall. In the extrusion, a die in which a slit of an inverted shape of the honeycomb formed body to be formed is provided on the extruded surface of the kneaded material can be used as the die for extrusion.

The dried honeycomb formed body is then fired to obtain a honeycomb fired body. The firing temperature and the firing atmosphere are different depending on the raw material, and those skilled in the art can select the firing temperature and the firing atmosphere that are the most suitable for the selected material.

Next, plugging portions are provided on open ends of the cells of the obtained honeycomb fired body. Specifically, first, a plugging material containing raw materials for forming a plugging portion is prepared. Next, a mask is applied to the inflow end face of the honeycomb formed body so as to cover the inflow cells. Next, the open ends of the outflow cells without the mask on the inflow end face side of the honeycomb formed body is filled with the prepared plugging material. Then, the outflow end face of the honeycomb formed body also is filled with the plugging material at the open ends of the inflow cells similarly to the above. The plugging material filled in open ends of the inflow cell and the outflow cell in this way is dried, heat treated at a temperature lower than 1300° C., which is sinter temperature of cordierite, as needed, and formed a plugging portion composed of a plurality of particles, whereby the honeycomb filter of the present invention can be manufactured.

EXAMPLES

The following will describe in more detail the present invention by examples, but the present invention is not at all limited by the examples.

Example 1

Talc, kaolin, alumina and silica were prepared as raw materials for preparing kneaded material. In Example 1, each raw material was blended so that the blending ratio (parts by mass) of each raw material was 39:18:14:14 to prepare a cordierite forming raw material.

Next, kneaded material was prepared by adding 4.0 parts by mass of foamable resin as a pore former, 5.6 parts by mass of binder, 0.5 parts by mass of surfactant, and 85 parts by mass of water to 100 parts by mass of the forming raw material. As a pore former, a water-absorbing polymer having a particle diameter of 30 μm was used. As a binder, methylcellulose was used. As a dispersing agent, potassium laurate soap was used.

Next, the obtained kneaded material was molded using an extruder to make a honeycomb formed body. Next, the obtained honeycomb formed body was dried by high frequency dielectric heating, and then further dried using a hot air dryer. The shape of the cells in the honeycomb formed body was quadrangular. The dried honeycomb formed body was then degreased and fired to produce a honeycomb structure.

Next, a plugging portion was formed on the honeycomb structure. First, the inflow end face of the honeycomb structure was masked. Next, the end portion provided with the mask (the end portion on the inflow end face side) was immersed in the plugging slurry, and the open ends of the cells without the mask (the outflow cell) were filled with the plugging slurry. In this way, the plugging portions were formed on the inflow end face side of the honeycomb formed body. Then, the plugging portions were formed on the inflow cell in the same manner for the outflow end face of the dried honeycomb formed body. In the plugging slurry, talc, kaolin, alumina, and silica were used as raw materials.

Next, the honeycomb formed body on which the plugging portions have been formed was dried with a microwave dryer, and further dried completely with a hot air dryer to manufacture a honeycomb filter of Example 1. In Example 1, the plugging portion was formed by drying the plugging slurry filled in open ends of the cells without firing the plugging portion in the production of the plugging portion.

The honeycomb filter of Example 1 had the diameter of the end faces of 191 μmm and the length in the extending direction of the cells of 152 μmm. The thickness of the partition wall was 0.229 μmm and the cell density was 46.5 cells/cm². Further, the porosity of the partition wall was 55.6%. The porosity of the partition wall was measured using Autopore 9500 (product name) manufactured by Micromeritics. Table 1 shows the results.

In addition, with respect to the plugging portion in the honeycomb filter of Example 1, "number of particles in visual field area of plugging portion", "porosity of plugging portion (%)", "average area of particles (μm²)", and "area of the particles having particle diameter d90 (μm²)" were measured. The measuring methods of the respective items are as described in the embodiments above. Table 1 shows the results.

TABLE 1

|  | Example 1 | Example 2 | Comparative Example 1 | Comparative Example 2 | Example 3 | Example 4 | Example 5 |
|---|---|---|---|---|---|---|---|
| Diameter of honeycomb structure (mm) | 191 | 191 | 118 | 118 | 132 | 118 | 132 |
| Length of honeycomb structure (mm) | 152 | 178 | 127 | 127 | 127 | 127 | 127 |
| Cell density (cells/cm²) | 46.5 | 46.5 | 46.5 | 46.5 | 46.5 | 46.5 | 46.5 |
| Partition wall thickness (mm) | 0.229 | 0.229 | 0.254 | 0.254 | 0.254 | 0.254 | 0.254 |
| Porosity of partition wall (%) | 55.6 | 55.1 | 64.6 | 65.1 | 65 | 63.4 | 64.2 |
| Cell shape | Quadrangle or Octagon | Quadrangle or Octagon | Quadrangle | Quadrangle | Quadrangle | Quadrangle | Quadrangle |
| Number of particles in visual field area of plugging portion (number) | 1904 | 2430 | 545 | 858 | 2348 | 2833 | 2879 |

TABLE 1-continued

|  | Example 1 | Example 2 | Comparative Example 1 | Comparative Example 2 | Example 3 | Example 4 | Example 5 |
|---|---|---|---|---|---|---|---|
| Porosity of plugging portion (%) | 47.85 | 47.41 | 64.71 | 67.4 | 63.64 | 55.55 | 57.49 |
| Average area of particles ($\mu m^2$) | 75 | 60 | 178 | 104 | 43 | 43 | 41 |
| Area of particles having particle diameter d90 ($\mu m^2$) | 21 | 8 | 41 | 31 | 35 | 48 | 37 |
| Evaluation of stress relaxation in end face | Good | Good | Acceptable | Acceptable | Excellent | Excellent | Excellent |

The honeycomb filter of Example 1 was evaluated for stress relaxation in the end face in the following manner. The results are shown in Table 1.

(Evaluation of Stress Relaxation in End Face)

A burner spalling test was performed using a burner tester with a standard pilot air flow rate of 50 NL/min and a standard pilot gas (LPG) flow rate of 2.5 NL/min. The temperature rising and falling times were 5 μminutes each, and the number of cycles was 10 cycles. The starting temperature was set at 820° C., the temperature was repeatedly stepped up by 50° C. until end face cracks occurred, and the presence or absence of the end face cracks was evaluated based on the following criteria. First, the maximum temperature at which no end face crack occurred was defined as the safety temperature (° C.), and an evaluation value in the evaluation of the stress relaxation in the end face was obtained by the following equation (1). A case where the evaluation value is 10 or more and less than 12 is evaluated as "acceptable", a case where the evaluation value is 12 or more and less than 15 is evaluated as "good", and a case where the evaluation value is 15 or more is evaluated as "excellent".

Evaluation value=Safety temperature (° C.)/[Partition wall thickness (mm)×25.4(inch/mm)]$^2$      Equation (1):

Examples 2 to 5

In Examples 2 to 5, the configurations of the honeycomb structure and the plugging portion were changed as shown in Table 1. In Examples 2 to 5, the plugging portion was made by drying plugging slurry using talc, kaolin, alumina, and silica as raw materials of the plugging slurry for making the plugging portion.

Comparative Examples 1 to 2

In Comparative Examples 1 to 2, the configurations of the honeycomb structure and the plugging portion were changed as shown in Table 1. In Comparative Examples 1 to 2, the plugging portion was made by firing plugging slurry using talc, kaolin, alumina, and silica as raw materials of the plugging slurry for making the plugging portion.

(Results)

The honeycomb filters of Examples 1 to 5 were evaluated as good or excellent in the evaluation of the stress relaxation in the end face. On the other hand, the honeycomb filters of Comparative Examples 1 to 2 were inferior to the honeycomb filters of Example 1 to 5 in the evaluation of the stress relaxation in the end face.

INDUSTRIAL APPLICABILITY

The honeycomb filter of the present invention can be used as a filter for trapping particulate matter in exhaust gas.

DESCRIPTION OF REFERENCE NUMERALS

1: partition wall, 2: cell, 2a: inflow cell, 2b: outflow cell, 3: circumferential wall, 4: honeycomb structure, 5: plugging portion, 11: inflow end face, 12: outflow end face, 100: honeycomb filter.

What is claimed is:

1. A honeycomb filter comprising:
   a pillar-shaped honeycomb structure having a porous partition wall disposed so as to surround a plurality of cells which serve as a fluid through channel extending from an inflow end face to an outflow end face; and
   a porous plugging portion provided at either an end on the inflow end face side or an end on the outflow end face side of the plurality of cells;
   wherein in a processed image obtained by binarizing an electron microscope image of a visual field area of 480 μm×640 μm of the plugging portion, the plugging portion is composed of a plurality of particles, and 1000 or more and 3500 or less particles of the plurality of particles each have an area of 0.25 $\mu m^2$ or more; and
   wherein in a particle size distribution of the particles of the plurality of particles having an area of 0.25 $\mu m^2$ or more in the processed image, the area of the particles having a particle diameter d90 when the cumulative value is 90% is 5 $\mu m^2$ or more and 62.5 $\mu m^2$ or less.

2. The honeycomb filter according to claim 1, wherein in the processed image, an average area of the particles of the plurality of particles having an area of 0.25 $\mu m^2$ or more is 20 $\mu m^2$ or more and 90 $\mu m^2$ or less.

3. The honeycomb filter according to claim 1, wherein in the processed image, a porosity of the plugging portion is 40% or more and 75% or less.

4. The honeycomb filter according to claim 1, wherein a porosity of the partition wall constituting the honeycomb structure is 45% or more and 75% or less.

* * * * *